(12) United States Patent
Ishiduka

(10) Patent No.: US 6,215,741 B1
(45) Date of Patent: Apr. 10, 2001

(54) OPTICAL RECORDING DEVICE HAVING A DEFECT DETECTION SYSTEM

(75) Inventor: Kenichi Ishiduka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/058,294

(22) Filed: Apr. 10, 1998

(30) Foreign Application Priority Data

Apr. 14, 1997 (JP) .................................................... 9-095811

(51) Int. Cl.⁷ .................................................. G11B 7/0037
(52) U.S. Cl. ........................ 369/44.34; 369/54; 369/116
(58) Field of Search ........................ 369/54, 116; 372/29; 250/201.5

(56) References Cited

U.S. PATENT DOCUMENTS

| | | | |
|---|---|---|---|
| 4,051,329 | * 9/1977 | Blondet et al. ........................ 369/116 |
| 4,150,402 | * 4/1979 | Tietze et al. ........................ 369/116 X |
| 4,162,398 | * 7/1979 | Kayanuma ........................ 369/116 X |
| 5,142,517 | * 8/1992 | Takahashi ........................ 369/44.25 X |
| 5,625,609 | * 4/1997 | Latta et al. ........................ 369/94 X |
| 5,786,890 | * 7/1998 | Noh ........................ 369/116 X |
| 5,805,559 | * 9/1998 | Murakami et al. ........................ 369/54 |
| 5,978,335 | * 11/1999 | Clark et al. ........................ 369/54 |

FOREIGN PATENT DOCUMENTS

| | | |
|---|---|---|
| 62-141641 | 6/1987 | (JP) . |
| 63-854 | 1/1988 | (JP) . |
| 3-84737 | 4/1991 | (JP) . |
| 4-49527 | 2/1992 | (JP) . |
| 9-96456 | 4/1994 | (JP) . |
| 1-211328 | 8/1998 | (JP) . |

* cited by examiner

*Primary Examiner*—Aristotelis M. Psitos
(74) *Attorney, Agent, or Firm*—McGuireWoods, LLP

(57) ABSTRACT

An optical recording device for use in a recording/reproducing operation has a photodetector for receiving a part of a laser beam generated by a laser source, and a CCD sensor for receiving the laser beam reflected from an optical disk and including information of the energy profile of the laser beam on the optical disk. The signal processor generates a defect signal representing an occurrence of a defect caused by the fluctuation of the laser power and/or the focal position and the cause of the defect during operation of the optical recording device.

10 Claims, 3 Drawing Sheets

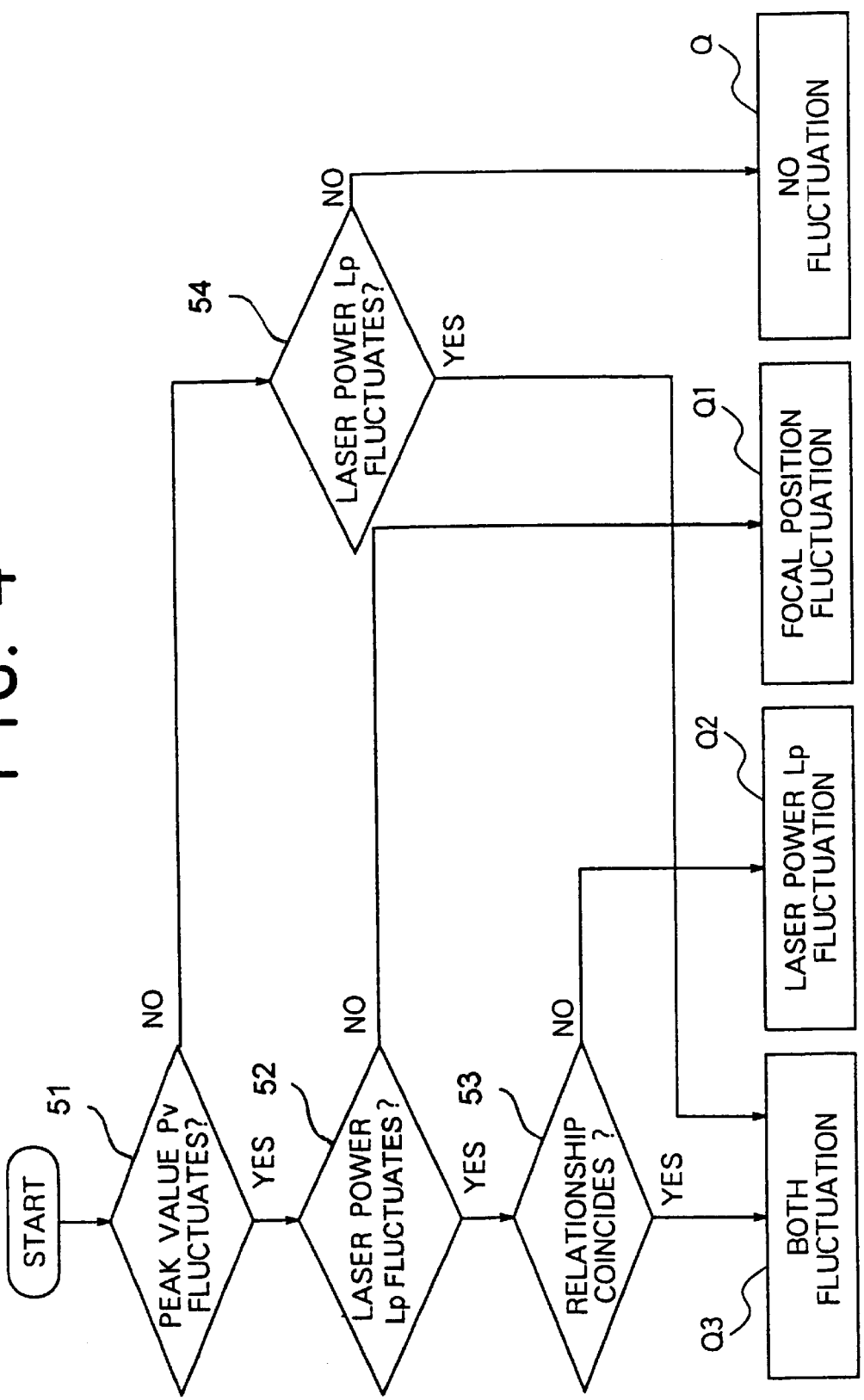

OPTICAL RECORDING DEVICE HAVING A DEFECT DETECTION SYSTEM

BACKGROUND OF THE INVENTION (a) Field of the Invention

The present invention relates to an optical recording device having a defect detection system and, more particularly, to a technique for detecting a defect generated in a groove pattern or in a recorded/reproduced data and the cause of the defect during the operation of the optical recording device.

(b) Description of the Related Art

Exposure of an optical disk to form a groove pattern on an optical disk or recording/reproducing operation of an optical disk is generally performed by an optical recording device having a laser source. In the exposure or recording/reproducing operation by using a laser beam, the focal position of the beam spot and a laser power from a laser source should be fixed without fluctuation in order to form a stable pattern in the exposure, to record an accurate data in the recording operation or reproduce an accurate data in the reproduction.

However, a fluctuation of the focal position or laser power is sometimes observed in the optical recording device after a continuous long time operation because of the change of the characteristics in the constituent elements or unstable factors of the optical recording device, and causes a defect in the exposure or recording/reproducing operation. If a defect is found in the resultant groove pattern or in the recorded data, the cause of the defect is generally examined in the optical recording device after the exposure or recording/reproducing operation is finished, because the examination and the operation cannot be performed concurrently.

The fluctuation of the focal position enlarges the diameter of the beam spot on the optical disk, which reduces the effective laser energy per unit area for the resultant groove pattern or in the recorded mark. As a result, an effective exposure or recording/reproducing operation can be achieved only in the central part of the beam spot which has a higher power density compared to the peripheral area of the beam spot. Accordingly, the size of a resultant groove pattern or recorded mark becomes smaller in the case of fluctuation of the focal position compared to the case of a normal focal position, and degrades the quality of the groove pattern, recorded data or reproduced data.

The defects caused by the fluctuation of the focal point and by the fluctuation of the laser power are similar so that it is generally difficult to determine the cause of the defect by examining the recorded mark or reproduced data during the exposure or recording operation, i.e., whether the defect is due to the fluctuation of the focal position or laser power from the laser source. The determination of the cause takes a long time examination, which reduces the throughput of the exposure or recording/reproducing.

SUMMARY OF THE INVENTION

It is therefore an object of the present invention to provide an optical recording device for use in an exposure of an optical disk to form a groove pattern or for use in a recording/reproducing operation, which is capable of detecting a defect in a resultant groove pattern or recorded/reproduced data and determining the cause of the defect during the exposure or recording/reproducing operation of the optical-recording device.

In accordance with the present invention, there is provided an optical recording device comprising a laser source for emitting a laser beam, an optical system for focusing the laser beam to irradiate the focused laser beam onto an optical disk and for passing the laser beam reflected by the optical disk, a first photodetector for receiving the laser beam before reflection by the optical disk to generate a first electric signal, a second photodetector for receiving the laser beam after reflection by the optical disk to generate a second electric signal, and a signal processor for calculating a laser power of the laser beam based on the first electric signal and a peak value of an energy distribution profile of the laser beam on the optical disk based on the second electric signal, the signal processor generating a defect signal representing an occurrence of a defect based on the laser power and the peak value.

The optical recording device according to the present invention can detect a defect caused by a laser power fluctuation and/or a peak value fluctuation of the energy profile of the laser beam on the optical disk, as well as the cause of the defect, during exposure or recording/reproducing operation of the optical recording device, thereby raising the throughput of the operation.

The above and other objects, features and advantages of the present invention will be more apparent from the following description, referring to the accompanying drawings.

BRIEF DESCRIPTION OF THE DRAWINGS

FIG. 4 is a flowchart of the operation of the optical recording device according to the embodiment of the present invention.

DESCRIPTION OF THE PREFERRED EMBODIMENTS

Now, the present invention is more specifically described with reference to accompanying drawings.

Figure 1:
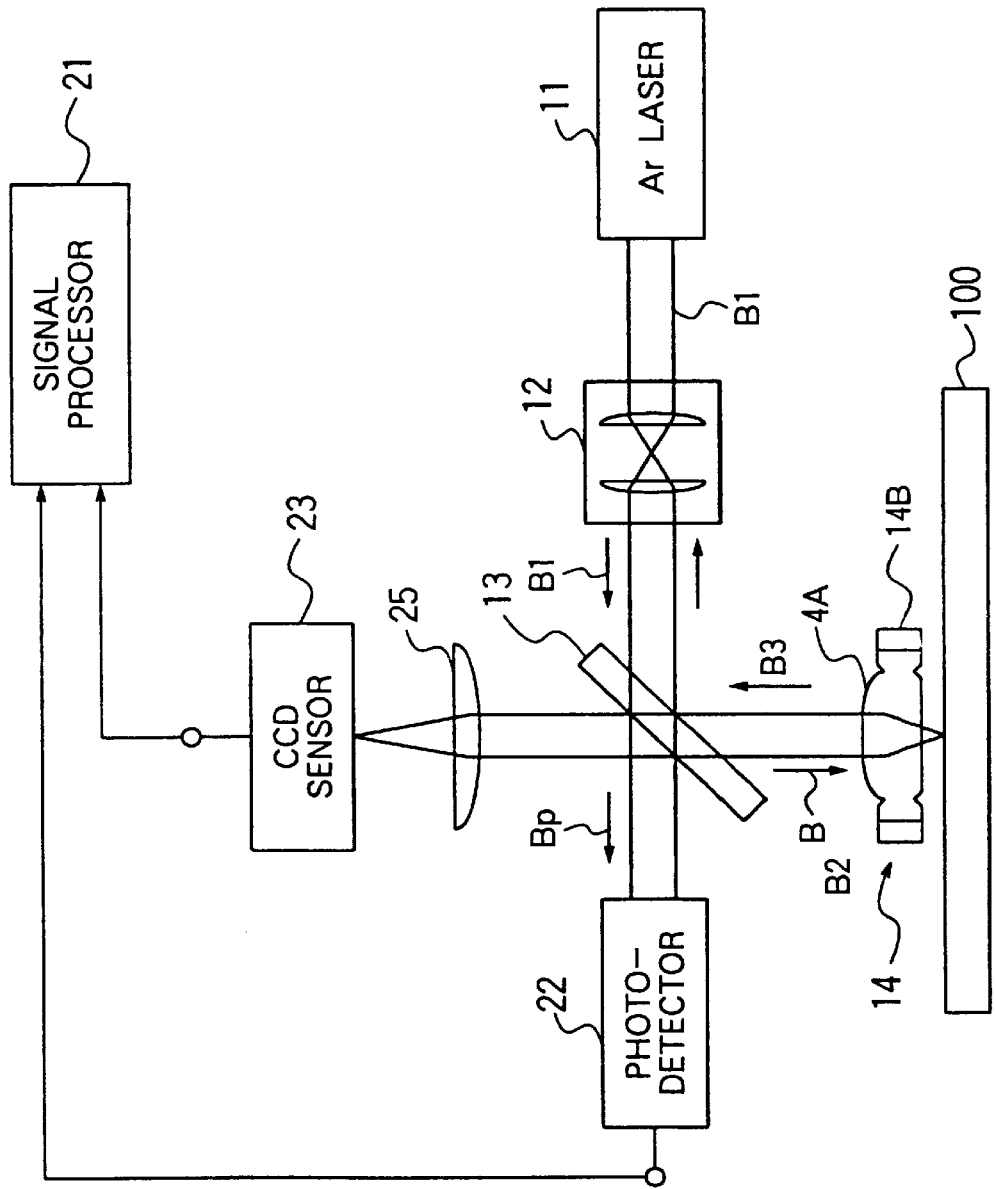
FIG. 1 is a block diagram of an optical recording device according to an embodiment of the present invention.

Referring first to FIG. 1, an optical recording device according to an embodiment of the present invention is directed to one used for recording/reproducing data on an optical disk 100. The optical recording device comprises an argon (Ar) laser 11, an optical system including a collimator lens 12, a half mirror 13 and a convex lens 25, an optical head 14 including an objective lens 14A and a lens actuator 14B, a photodetector 22, a CCD (charge coupled device) sensor 23 and a signal processor 21.

The laser B1 emitted by the Ar laser 11 passes the collimator lens 12 to be partly reflected by the half mirror 13 acting as an optical divider. The reflected laser beam B2 is then incident on the optical disk 100 after being focused by the objective lens 14A. The objective lens 14A is moved by the lens actuator 14B in the vertical direction for forming a focus on the surface of the optical disk 100. The other part Bp of the laser beam B1 emitted by the Ar laser 11 passes the half mirror 13 to be detected by the photodetector 22 as a signal for the power of the emitted laser beam B1.

A small part of the laser beam B3 reflected from the optical disk 100 passes the half mirror 13 to be focused by the convex lens 25 and incident on the CCD sensor 23. The electric signal from the CCD sensor 23 has information of an energy profile of the laser beam on the optical disk 100. The electric signal from the photodetector 22 has information of the power level of the emitted laser beam B1, which includes information of the fluctuation of the power of the emitted laser beam B1. Both the electric signals from the photodetector 22 and the CCD sensor 23 are supplied to the signal processor 21.

The signal processor 21 has functions of detecting a power fluctuation in the laser beam B1 based on the output signal from the photodetector 22, the peak value in the reflected laser beam B3 based on the output signal from the, CCD sensor 23, and a peak fluctuation in the reflected laser beam B3. The signal processor 21 also has a function of detecting a defect possibly generated in the recorded data on the optical disk and determining the cause of the defect, based on the power fluctuation of the laser beam B1 and the peak value and the peak fluctuation in the reflected laser beam B3.

Figure 2:
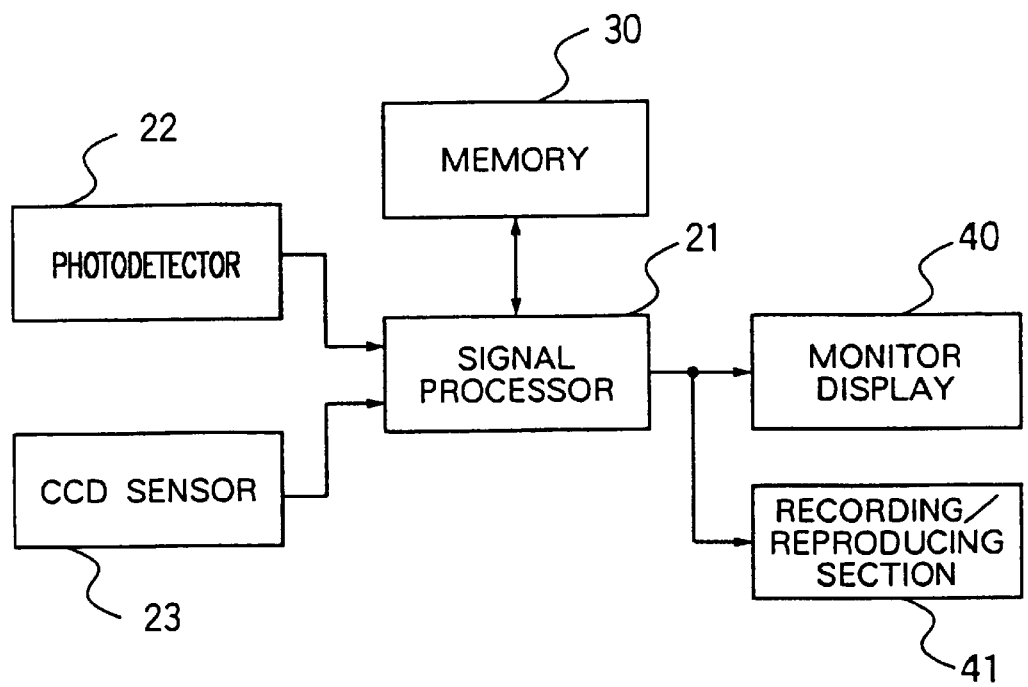
FIG. 2 is a block diagram of the optical recording device of FIG. 1 for showing signal flows therein.

FIG. 2 shows a block diagram depicting the signal flows in the optical recording device of FIG. 1. The signal processor 21 receives outputs from the photodetector 22 and the CCD sensor 23, as described before, to control the recording/reproducing section 41 of the optical recording device and deliver data including a message for informing occurrence of a defect in the recorded/reproduced data, as well as the cause thereof, to a monitor display 40. The monitor display 40 receives any data supplied to or from the signal processor 21 and can display the respective data for assisting the operator to determine occurrence of a defect and the cause thereof based on the displayed data.

Figure 3:
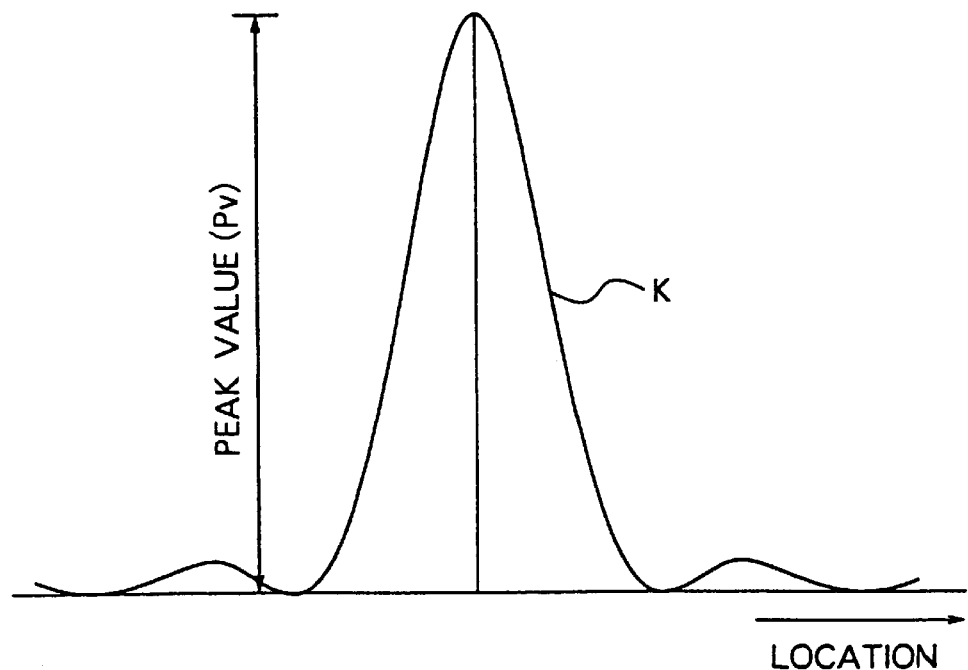
FIG. 3 is a graph for showing a profile of laser intensity in the output signal from the CCD sensor in FIG. 1.

Before operation of the optical recording device of the present embodiment, the signal processor 21 obtains and stores in a memory 30 data for a normal laser power from the Ar laser 11, a normal peak value of the energy profile of the reflected laser beam B3 and a normal relationship, such as a ratio, between the laser power and the peak value, by experimental processing under a normal condition wherein a fluctuation of the laser power, for example, does not arise. An example of the energy profile of the reflected laser beam B3 obtained from the output of the CCD sensor 23 is plotted in FIG. 3 against the radial position of the optical disk 100, wherein the peak value Pv is shown in the energy profile.

The optical recording device according to the present embodiment can detect occurrence of a defect and the cause thereof as detailed below. If no fluctuation of the peak value Pv and no fluctuation of the laser power are detected, the optical recording device is considered to be in a normal operation, with a message of no fluctuation on the monitor display. If only the fluctuation of the peak value Pv is detected, the optical recording device is considered to generate a defect in the optical disk based on the fluctuation of the focal position. If both the fluctuations of the laser power and the peak value Pv are detected, the relationship between the peak value Pv and the laser power is examined to determine whether both the laser power and the peak value Pv fluctuated or only the laser power fluctuated, with reference to the normal relationship between the laser power and the peak value, which will be described later.

If only the fluctuation of the laser power is detected, it is determined that both the laser power and the peak value Pv fluctuated, although this case is very rare because it involves an increase of the laser power. Specifically, this case occurs when the focal position deviates from the surface of the optical disk and the laser power increases to cancel the decrease of the peak value.

Referring to FIG. 4, there is shown a flowchart of the operation of the optical recording device according to the present embodiment. During a recording operation, for example, of the optical disk, the signal processor 21 monitors the peak value Pv of the energy profile of the reflected laser beam based on the output of the CCD sensor 23 and the laser power Lp based on the output of the photodetector 22. The data for the laser power and the peak value during the operation of the optical recording device is recorded for a specified time length for allowing later examination of the cause of the defect.

If a fluctuation of the peak value Pv is detected in step S1 during operation of the optical recording device, it is examined whether or not the laser power Lp fluctuated in step S2. If it is detected in step S2 that the laser power Lp also fluctuated, the relationship between the laser power Lp and the peak value Pv is examined with reference to the normal relationship stored in the memory 30 in step S3. If it is judged that the relationship between the laser power Lp and the peak value Pv does not coincide with the normal relationship stored in the memory 30, it is determined that both the laser power Lp and the focal position Fp fluctuated, and the message Q3 thereof is displayed on the monitor display 40 together with the message of occurrence of a defect in the recorded data.

If it is judged in step S3 that the relationship between the laser power Lp and the peak value Pv does not deviate from the normal relationship stored in the memory 30, it is determined that only the laser power Lp fluctuated and the message Q2 thereof together with the message of occurrence of a defect is displayed on the monitor display 40. If it is judged in step S2 that the laser power Lp does not fluctuate, it is determined that the focal position Fp fluctuated and the message Q1 thereof together with the message of occurrence of a defect is displayed.

If the peak value Pv does not fluctuate in step S1, it is examined that the laser power Lp fluctuates in step S4. If it is judged in step S4 that the laser power Lp fluctuates, it is determined that both the focal position F and the laser power Lp fluctuated and the message Q3 thereof together with the message of occurrence of a defect is displayed. If it is judged in step S4 that laser power Lp does not fluctuates, it is determined that both the laser power Lp and the focal position Fp are normal and an accurate recording is effected without a defect.

In the above embodiment, the photodetector may be omitted if the laser power can be detected by the CCD sensor by summing the reflected laser beam in the signal processor.

According to the optical recording device of the present embodiment, a defect due to the fluctuation of the laser power and/or focal position of the laser beam can be detected during operation of the exposing or recording/reproducing operation, without a specific examination of the recorded data.

Since the above embodiments are described only for examples, the present invention is not limited to the above embodiments and various modifications or alterations can be easily made therefrom by those skilled in the art without departing from the scope of the present invention.

For example, the optical recording device may be a device which exposes the surface of the optical disk by a laser beam for forming a groove pattern on an original optical disk or a device for use in reproduction of data from an optical disk. Further, the optical recording device can compare the data for the peak value fluctuation and the laser power fluctuation between different optical disks.

What is claimed is:

1. An optical recording device, comprising:

a laser source for emitting a laser beam, an optical system for focusing the laser beam to irradiate the focused laser beam onto an optical disk and for passing the laser beam reflected by the optical disk, a first photodetector for receiving the laser beam before reflection by the optical disk to generate a first electric signal, a second photodetector for receiving the laser beam after reflection by the optical disk to generate a second electric signal, a signal processor for calculating a fluctuation in laser power of the laser beam based on the first electric signal and a fluctuation of a peak value of an energy distribution profile of the laser beam on the optical disk based on the second electric signal, and a memory for storing a previously predetermined relationship values between laser power and an energy distribution peak value, said signal processor comparing a present ratio of said fluctuation in laser power and said fluctuation of the peak value of the energy distribution to said previously predetermined relationship values stored in said memory, said signal processor generating a defect signal representing an occurrence of a defect based on an outcome of said comparison.

2. An optical recording device as defined in claim 1, wherein said second photodetector is a charge coupled device (CCD) sensor.

3. An optical recording device as defined in claim 1, wherein said defect signal represents a cause of the defect.

4. An optical recording device as defined in claim 3, wherein said signal processor generates the defect signal based on a first fluctuation of the laser power and a second fluctuation of the peak value.

5. An optical recording device as defined in claim 3, wherein said signal processor generates the defect signal representing an occurrence of a laser power fluctuation as the cause of the defect based on a presence of the first fluctuation.

6. An optical recording device as defined in claim 5, wherein said predetermined relationship is a normal relationship between the laser power and the peak value.

7. An optical recording device as defined in claim 6, wherein said signal processor generates the defect signal representing a presence of both the laser power fluctuation and a peak value fluctuation when a relationship between the laser power and the peak value deviates from the normal relationship.

8. An optical recording device as defined in claim 7, wherein said signal processor generates the defect signal representing a presence of the laser power fluctuation when a relationship between the laser power and the peak value coincide with the normal relationship.

9. An optical recording device as defined in claim 7, wherein said signal processor generates the defect signal representing a presence of both the laser power fluctuation and the peak value fluctuation in a presence of the peak value fluctuation and an absence of the laser power fluctuation.

10. An optical recording device as defined in claim 1, further comprising:

a monitor for displaying an visual indication of existence of a defect and a cause of said defect based on said defect signal.

* * * * *